3,149,628
BLOOD PRESSURE DETECTOR
Victor W. Bolie, Ames, Iowa, assignor to Iowa State University Research Foundation, Inc., Ames, Iowa, a corporation of Iowa
Filed Dec. 4, 1961, Ser. No. 156,900
3 Claims. (Cl. 128—2.05)

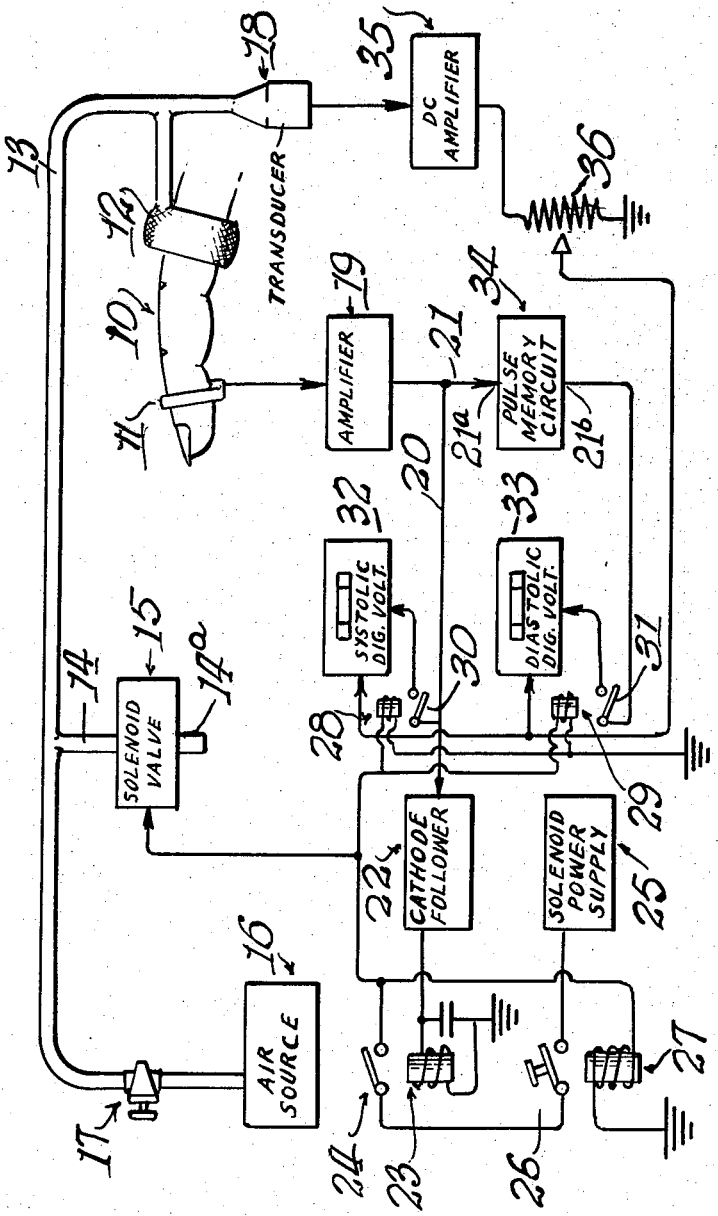

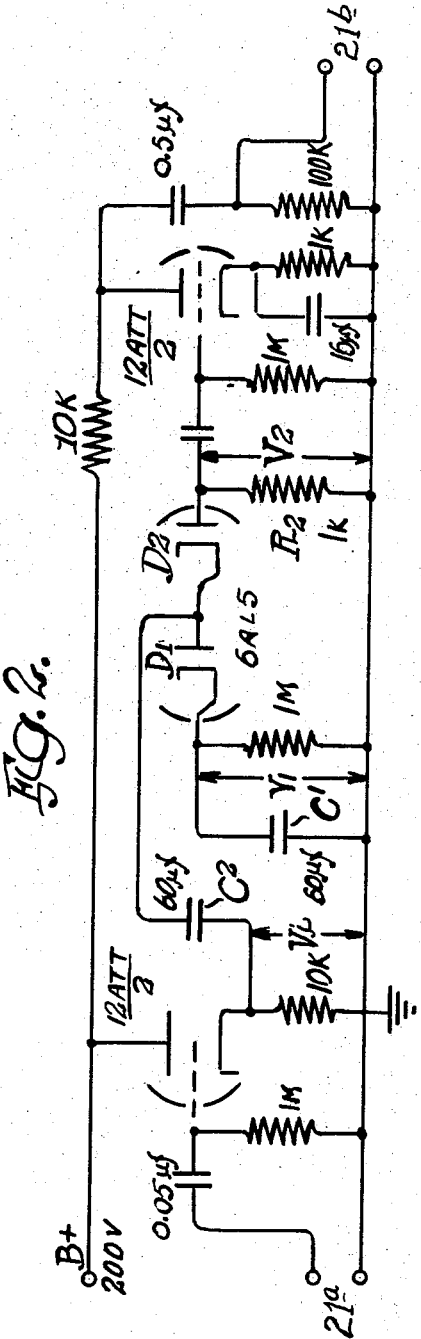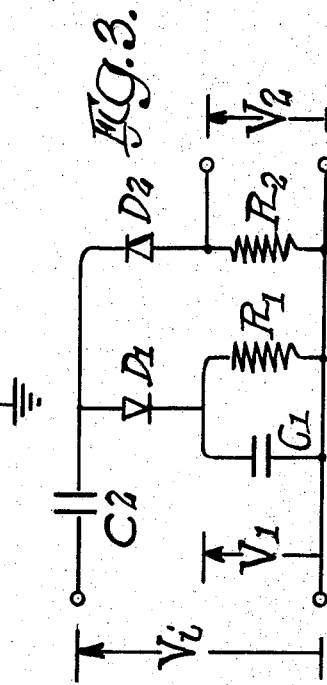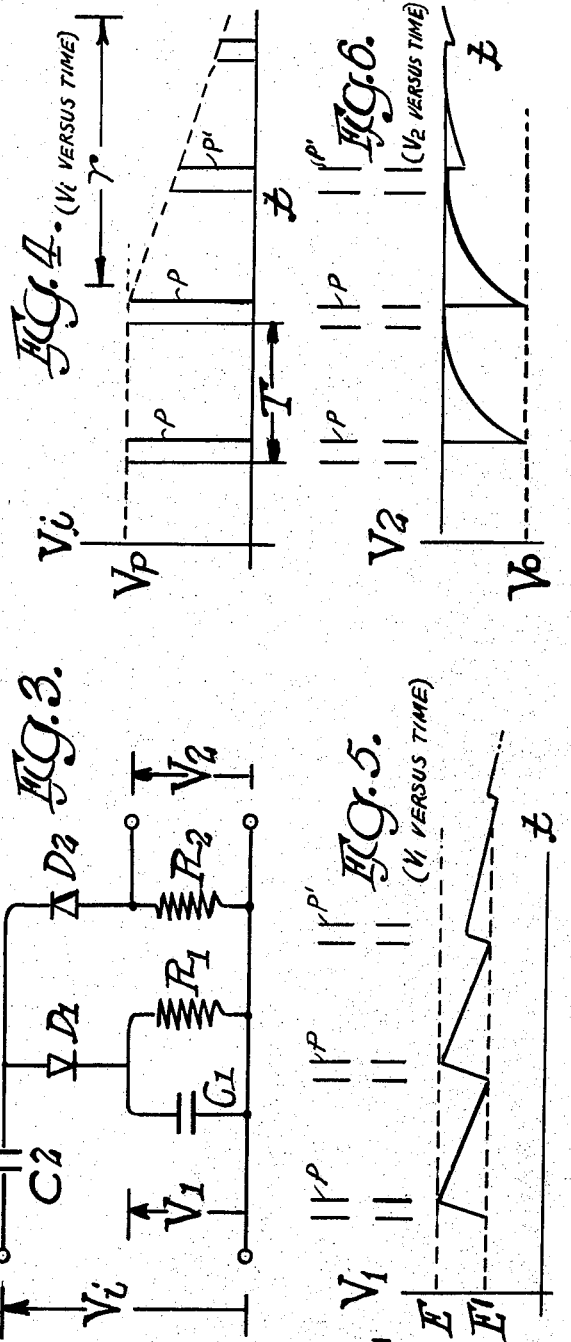

This invention relates to a blood pressure detector, and, more particularly, to a blood pressure detector which operates automatically to report systolic and diastolic pressures upon only the application of an initiating signal.

It is an object of this invention to interconnect various electro-mechanical components in such a way that a complete testing sequence, for sampling and permanently displaying systolic and diastolic pressures is initiated by pressing only one button, which releases automatically when the sequence is complete.

Another object is to provide an automatic blood pressure detector readily adapted to various regions of the body, finger, leg, toe, or internal organs, as desired.

Still another object of the invention is to provide a novel automatic blood pressure detector embodying a novel pulse memory circuit.

Other objects and advantages of this invention may be seen in the details of construction and operation set down in this specification.

The invention will be explained in conjunction with the accompanying drawing, in which—

FIG. 1 is a schematic diagram of the apparatus as applied to the finger of a patient;

FIG. 2 is a circuit diagram of the pulse memory circuit represented schematically in FIG. 1;

FIG. 3 is a schematic representation of the circuit of FIG. 2 to illustrate the theory of operation thereof; and FIGS. 4, 5 and 6 are all graphs of voltage versus time at various portions of the circuit of FIG. 3, and as designated therein, the voltages being designated $V_i$, $V_1$ and $V_2$, respectively.

In the illustration given, and with particular reference to FIG. 1, the numeral 10 designates the finger of a patient whose blood pressure is sought to be tested. The numeral 11 designates a pulse pick-up such as a strain gauge, light and photo-cell, piezoelectric crystal, capacitance transducer, etc., applied to the finger, and which is effective to develop a signal corresponding to the blood pressure pulsations, the signal being electrical in nature and illustrated as a sequence of rectangular pulses in FIG. 4.

The numeral 12 designates an inflatable cuff installed about the finger 10 is such a position as to shut off blood flow to the portion of the finger 10 (or other physiological element) occupied by the pulse pick-up 11, when the cuff 12 is inflated. The cuff 12 is seen to be coupled to a pressure fluid (compressed air) supply line 13, which is equipped with an escape vent 14 regulated by means of a solenoid valve 15. The pressure fluid to the cuff 12 is supplied by a source 16 through an adjustable high resistance bleeder valve 17. The change in pressure is sensed by a transducer 18 which may be also a strain gauge or a resistive element potentiometer such as is manufactured by Bourn Laboratories of Ames, Iowa.

The output from the pulse pick-up is delivered to an amplifier 19 which is especially sensitive to inputs in the range of 2–100 cycles per second. The output of the amplifier 19 is conducted along a pair of lines 20 and 21. The line 20 is coupled to a cathode follower 22 and through it to ground by means of a relay 23. Thus, when the pulse pick-up is sensing pulses, the cathode follower passes current and the contacts 24 of relay 23 are closed.

The relay contacts 24 are interposed in a circuit between the solenoid power supply 25 and the solenoid valve 15. However, the solenoid valve 15 is only energized upon the closure of the main switch 26.

Briefly recapitulating, when the finger 10 is pulsing blood in the area of the pulse pick-up 11, a signal is delivered which makes it possible to initiate a measuring cycle by means of closing the switch 26. The electrical line from the solenoid power supply 25 to the solenoid valve, when the relay contacts 24 and switch 26 are closed, also is effective to energize a relay 27 which holds the switch 26 in closed position. Still further, the flow of current from the solenoid power supply under these conditions is effective to energize relays 28 and 29 closing relay contacts 30 and 31 respectively, which are effective to couple gating signals along lines 20 and 21 to digital voltmeters 32 and 33, respectively.

It will be noted that the line 21 is equipped with a pulse memory circuit generally designated 34, having an input as at 21a and an output at 21b the details of which will be explained after a generalized description of the operation of the apparatus. Before going into the operation, it should be pointed out that the output of the pressure transducer 18 may be amplified through a D.-C. amplifier 35 suitably modified by a potentiometer 36, which output is delivered to both digital voltmeters 32 and 33. The digital voltmeter 32 reports the systolic pressure, while the digital voltmeter 33 reports the diastolic pressure.

*Operation*

Initially, the finger is fitted with a loose-fitting, inflatable cuff 12 and a snug-fitting pulse pick-up 11. Signals from the pulse pick-up 11 are fed to the amplifier 19, whose output pulses drive the cathode follower 22 to maintain the capacitance shunted relay (23, 24) in the closed circuit condition as long as the pick-up 11 senses pulses in the finger.

As long as the relay switch 26 remains open, the pressure source 16 (300 mm. Hg) loses air at an adjustably slow rate through the normally open solenoid valve 15 and out the escape vent 14a associated therewith. When the switch 26 is manually closed, it will not open again as long as finger pulses are sent by the pick-up 11, during which time the solenoid valve 15 is energized into the closed condition, causing an adjustably slow inflation of the finger cuff 12.

The inflation pressure in the finger cuff is converted into a corresponding voltage by the pressure transducer 18, D.-C. amplifier 35, and scale factor potentiometer 36, the output of which is retentively sampled by the two digital voltmeters 32 and 33 so long as they receive gating signal pulses from lines 20 and 21. The gating signals activate the digital voltmeters only while the finger cuff is being inflated, through the action of the relays (28 and 30) and (29 and 31) which are energized in parallel with the solenoid valve 15.

The pulse memory circuit is fed from the 2–100 c.p.s. pulse amplifier 19, and has the function of producing corresponding output pulses only if its input pulses are not diminishing in amplitude.

As the pressure in the finger cuff begins to increase, the cuff pressure is displayed retentively on both digital voltmeters 32 and 33 after each pulse is sensed by the finger pick-up. As soon as the cuff pressure exceeds diastolic pressure, the sensed pulses will begin to decrease in amplitude, causing the pulsing memory circuit 34 to stop emitting gating signals. Hence, the corresponding digital voltmeter 33 will display diastolic pressure without further change during the remainder of the cycle—until an entirely new cycle of operation is initiated manually by the reclosing of switch 26.

As the cuff pressure further increases, the digital voltmeter 32 will continue sampling and displaying cuff pressure after each pulse is sensed by the finger pick-up 11 until the cuff pressure reaches systolic pressure, at which time the gating signals disapper entirely (on line 20). Hence, the digital voltmeter 32 will display systolic pressure without further change until an entirely new cycle of events is initiated manually (as indicated immediately above).

Shortly after the gating signals from the 2-100 c.p.s. amplifier 19 vanish, the contacts of capacitance-shunted relay (23 and 24) fall open, thus deenergizing relays (28 and 30) and (29 and 31), as well as the relay core 27 and the solenoid valve 15. The finger cuff then deflates through the escape vent 14a, while the systolic and diastolic pressures remain displayed on the digital voltmeters 32 and 33, respectively. The complete cycle of events can be repeated if the relay switch (26 and 27) is again closed manually.

For optimum operation, the setting of the adjustable high resistance bleeder valve 17 should be left at a point which permits the finger cuff to be inflated to a pressure of 300 mm. Hg in about 30 seconds.

The pulsing memory circuit generally designated 34 is set down explicitly in FIG. 2, with the value of the various elements or parameters designated thereon. However, it is believed that the operation and theory of the circuit can be much more readily appreciated from a consideration of FIG. 3, where like letter designations are employed.

Referring now to FIG. 3, it will be seen that the voltage $V_1$ is applied to a capacitance $C_2$ arranged in series with two parallel subcircuits, the first subcircuit including diode $D_1$ in series with an RC circuit made up of $R_1$ and $C_1$ in parallel. The second subcircuit includes diode $D_2$ in series with resistance $R_2$, with resistance $R_2$ and capacitance $C_2$ constituting a second RC or time-delay circuit. The voltage pulses P that emanate from the pulse pick-up 11 are seen schematically in FIG. 4 and have a value of $V_2$. The voltage thus generated causes current flow through the diode $D_1$ to apply a voltage $V_1$ to capacitance $C_1$ and to charge it to a voltage indicated E and seen in FIG. 5. Upon cessation of a pulse P, the RC circuit made up of $C_1$ and $R_1$ discharges through resistance $R_1$ to lower the voltage $V_1$ to the level $E'$, while the capacitance $C_2$ discharges through diode $D_2$ and resistance $R_2$ to provide the voltage pattern $V_2$ seen in FIG. 6. This condition persists until the pulses P diminish in amplitude as at $P'$ below the incompletely discharged voltage $E'$ remaining across the capacitance $C_1$, whereupon there will be no electrical charge delivered to $C_1$ through the diode $D_1$. Therefore the capacitance $C_2$ will not draw a discharge current through diode $D_2$ and resistance $R_2$ upon cessation of the diminished-amplitude input voltage pulse. This, then, accounts for the fact that the diastolic pressure-reporting voltmeter 33 stops reporting pressure as soon as there is a decrease in the amplitude of the pulse sensed by the pick-up 11. In effect, the pulse memory circuit retains between each pulse a memory of the amplitude of the previous pulse and compares it with a subsequent pulse. When that subsequent pulse is diminished in amplitude, its effect is eliminated by means of the memory circuit and no gating pulse then appears at the output to cause the diastolic digital voltmeter 33 to continue any further sampling of pressure in the finger cuff 12.

The circuit illustrated in FIG. 3 may be better understood by the following analysis, where a mathematical approach to the operation of the circuit is set down.

*Steady-State Analysis*

$V_1$ is a pulse train of amplitude $V_P$, period T, and low duty-cycle. This can be seen graphically in FIG. 4. In FIGS. 5 and 6, the pulses P of FIG. 4 have been applied above the particular wave forms to show the relationship of voltage changes across $C_1$ and $R_2$, respectively, with the occurrence of the pulses P. In the ensuing steady-state analysis, the voltage change across the capacitance $C_1$ is seen to vary in a sawtooth fashion in FIG. 5 and between the levels $E'$ and $E$. The voltage $V_2$ occurring across the resistance $R_2$ is seen to also have a general sawtooth pattern, dropping to the level of $V_0$.

Assume that $$R_1C_1 \gg T, \quad R_2C_2 \ll T$$

If the duty-cycle is low enough, then $$C_2(P_P - E) = C_1(E - E')$$

$$E' = Ee - T/R_1C_1 \rightarrow E - E' \cong E\frac{T}{R_1C_1}$$

$$V_P - E = \frac{C_1}{C_2}E\frac{T}{R_1C_1} \rightarrow V_P = E\left[1 + \frac{C_1}{C_2}\frac{T}{R_1C_1}\right]$$

The capacitor $C_2$ charges through $D_1$ to a voltage $(V_P - E)$, and discharges through $D_2$ and $R_2$.

$$V_0 = V_P - E = \frac{C_1}{C_2}\frac{T}{R_1C_1}E = \frac{C_1}{C_2}\frac{T}{R_1C_1}\frac{V_P}{1+\frac{C_1}{C_2}\frac{T}{R_1C_1}}$$

$$= \frac{V_P}{1+\frac{C_2}{C_1}\frac{R_1C_1}{T}} = \frac{V_P}{1+\frac{R_1C_2}{T}}$$

*Signal Extinction Analysis*

In the following extinction analysis, the pulses $P_1$ of FIGS. 4-6 are of lower amplitude, corresponding to partial collapse of the arterial wall. The period of extinction is designated $\tau$ in FIG. 4. The lower amplitude pulse $P'$ is ineffective to increase the charge on capacitor $C_1$ to the extent necessary to cause current flow through $R_2$.

The output pulses $V_2$ will disappear if $$V_D\left(1 - \frac{T}{\tau}\right) \le E'$$

$$E' \cong \left(1 - \frac{T}{R_1C_1}\right)E = \frac{V_P}{1+\frac{T}{R_1C_2}}\left(1 - \frac{T}{R_1C_1}\right)$$

$$V_P\left(1 - \frac{T}{\tau}\right) \le V_P\frac{1 - \frac{T}{R_1C_1}}{1 + \frac{T}{R_1C_2}}$$

$$1 - \frac{1 - \frac{T}{R_1C_1}}{1 + \frac{T}{R_1C_2}} \le \frac{T}{\tau}$$

$$\frac{\left(1 + \frac{T}{R_1C_2}\right) - \left(1 - \frac{T}{R_1C_1}\right)}{1 + \frac{T}{R_1C_2}} \le \frac{T}{\tau}$$

$$\frac{T}{R_1}\frac{\frac{1}{C_2} + \frac{1}{C_1}}{1 + \frac{T}{R_1C_2}} \le \frac{T}{\tau}$$

$$\tau \le \frac{R_1\left(1 + \frac{T}{R_1C_2}\right)}{\frac{C_1 + C^2}{C_1C_2}} = \frac{R_1C_1C_2\left(1 + \frac{T}{R_1C_2}\right)}{C_1 + C_2}$$

$$\therefore \tau \le \frac{C_1}{C_1 - C_2}(T + R_1C_2)$$

While in the foregoing specification I have set down a detailed description of an embodiment of the invention for the purpose of illustration thereof, many variations in the details herein given may be made by those skilled in the art without departing from the spirit and scope of the invention.

I claim:
1. In a blood pressure detector, means including an inflatable cuff and a pulse pick-up for restricting flow of blood and sensing the flow of blood so restricted, means including a pressure transducer and a pair of digital voltmeters coupled to said cup for reporting the diastolic and systolic pressures, means including a source of pressure fluid for inflating said cuff and coupled thereto, means for coupling said pulse pickup to said voltmeters, including separate gating lines for energizing said voltmeters to respond to the output from said transducer, and means including a pulse memory circuit in the gating line coupling said pulse pick-up to the diastolic pressure-reporting voltmeter, said pulse memory circuit comprising first means including a first diode and a first RC circuit, second means including a second diode and a second RC circuit, and means interconnecting said first and second means for opposing the voltage in said first RC circuit against the voltage applied to said pulse memory circuit whereby said pulse memory circuit is responsive to decrease in amplitude of successive pulses from said pulse pick-up to deenergize said diastolic pressure-reporting voltmeter upon decrease in pulse amplitude.

2. The detector of claim 1 in which the time constant of said first RC circuit is of the order of one hundred times greater than the time constant of the second RC circuit.

3. The detector of claim 1 in which the capacitance of said second means is series-connected with said first means, the diode and resistance of said second means being connected in parallel with said first means.

References Cited in the file of this patent
UNITED STATES PATENTS

| | | |
|---|---|---|
| 2,492,617 | Boland | Dec. 27, 1949 |
| 2,756,741 | Campanella | July 31, 1956 |
| 2,827,040 | Gilford | Mar. 18, 1958 |
| 2,865,365 | Newland | Dec. 23, 1958 |
| 2,875,750 | Boucke | Mar. 3, 1959 |
| 3,051,165 | Kompelien | Aug. 28, 1962 |